United States Patent
Wu et al.

(10) Patent No.: US 11,438,918 B2
(45) Date of Patent: Sep. 6, 2022

(54) SCHEDULING REQUEST WITH DIFFERENT NUMEROLOGIES

(71) Applicant: Nokia Technologies Oy, Espoo (FI)

(72) Inventors: Chunli Wu, Beijing (CN); Lei Du, Beijing (CN); Benoist Sebire, Tokyo (JP); Samuli Turtinen, li (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/470,597

(22) PCT Filed: Dec. 13, 2017

(86) PCT No.: PCT/FI2017/050882
§ 371 (c)(1),
(2) Date: Jun. 18, 2019

(87) PCT Pub. No.: WO2018/127620
PCT Pub. Date: Jul. 12, 2018

(65) Prior Publication Data
US 2019/0342902 A1 Nov. 7, 2019

Related U.S. Application Data

(60) Provisional application No. 62/442,154, filed on Jan. 4, 2017.

(51) Int. Cl.
*H04W 72/12* (2009.01)
*H04L 1/16* (2006.01)
(Continued)

(52) U.S. Cl.
CPC ....... *H04W 72/1268* (2013.01); *H04L 1/1642* (2013.01); *H04L 5/0082* (2013.01); *H04W 72/0446* (2013.01)

(58) Field of Classification Search
CPC . H04W 72/1268; H04W 72/12; H04W 72/04; H04W 74/04; H04W 72/0446;
(Continued)

(56) References Cited

U.S. PATENT DOCUMENTS 9,071,984 B1 * 6/2015 Vivanco ............ H04W 28/0231
2012/0069805 A1 * 3/2012 Feuersanger ..... H04W 72/0413
370/329

(Continued)

FOREIGN PATENT DOCUMENTS

KR  20160108829 A  9/2016
RU     2563589 C2  9/2015
(Continued)

OTHER PUBLICATIONS

"New SID Proposal: Study on New Radio Access Technology", 3GPP TSG-RAN meeting #71, RP-160671, Agenda Item: 9.1, NTT Docomo, Mar. 7-10, 2016, 8 pages.
(Continued)

*Primary Examiner* — Kwang B Yao
*Assistant Examiner* — Syed M Bokhari
(74) *Attorney, Agent, or Firm* — Harrington & Smith (57) ABSTRACT

A method is provided including determining a mapping of a scheduling request to one or more logical channels configured for a user equipment; in response to a received scheduling request, allocating an uplink radio resource such that a transmission time interval of the allocated uplink radio resource has a length corresponding to length of a transmission time interval configured for the mapped one or more logical channels; and receiving data on the allocated uplink radio resource. A further method includes transmitting a scheduling request mapped to one or more logical channels configured for a user equipment; receiving an allocation of an uplink radio resource wherein a transmission time inter-
(Continued)

val of the allocated uplink radio resource has a length corresponding to length of a transmission time interval configured for the mapped one or more logical channels; and sending data on the allocated uplink radio resource.

16 Claims, 6 Drawing Sheets

(51) Int. Cl.
*H04L 5/00* (2006.01)
*H04W 72/04* (2009.01)

(58) Field of Classification Search
CPC ... H04L 1/1642; H04L 5/0082; H04L 5/0044; H04L 5/0007; H04L 5/00
USPC .................................................. 370/329, 336
See application file for complete search history.

(56) References Cited

U.S. PATENT DOCUMENTS

| | | | |
|---|---|---|---|
| 2012/0269154 A1* | 10/2012 | Wang | H04W 72/1242 370/329 |
| 2015/0173099 A1* | 6/2015 | Sun | H04L 1/1854 370/336 |
| 2016/0021646 A1* | 1/2016 | Hu | H04W 52/28 370/329 |
| 2016/0100397 A1 | 4/2016 | Wen et al. | |
| 2016/0150532 A1 | 5/2016 | Bhushan et al. | |
| 2016/0227564 A1* | 8/2016 | Stephenne | H04W 28/24 |
| 2017/0265181 A1* | 9/2017 | Patel | H04W 72/0446 |
| 2017/0290008 A1* | 10/2017 | Tooher | H04L 1/1893 |
| 2017/0332377 A1* | 11/2017 | Tseng | H04W 72/0413 |
| 2018/0049227 A1 | 2/2018 | Moon et al. | |

FOREIGN PATENT DOCUMENTS

| | | |
|---|---|---|
| RU | 2604658 C1 | 12/2016 |
| WO | 2007/025160 A2 | 3/2007 |
| WO | 2015/122701 A1 | 8/2015 |
| WO | 2016/040290 A1 | 3/2016 |
| WO | 2018/031638 A1 | 2/2018 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321, V14.0.0, Sep. 2016, pp. 1-96.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.0.0, Sep. 2016, pp. 1-644.
"MAC with Multiple Numerologies/Multiple TTI Lengths", 3GPP TSG-RAN WG2 meeting #96, R2-168012, Agenda: 9.2.1.2, Nokia, Nov. 14-18, 2016, 3 pages.
"MAC Entities to Support Multiple NR Verticals", 3GPP TSG-RAN2 meeting #96, R2-168531, Agenda: 9.2.1.3, Intel Corporation, Nov. 14-18, 2016, 5 pages.
"MAC Aspects to Support Multiple Service Verticals", 3GPP TSG-RAN WG2 meeting #96, R2-168175, Agenda: 9.2.1.2, Samsung, Nov. 14-18, 2016, 3 pages.
"WF on Wider BW Operation for NR", 3GPP TSG-RAN WG1 Meeting #86bis, R1-1610488, Agenda: 8.1.2, NTT Docomo, Oct. 10-14, 2016, 4 pages.
"Final Report of 3GPP TSG RAN WG1 #86 v1.0.0", 3GPP TSG-RAN WG1 Meeting #86bis, R1-1608562, MCC Support, Oct. 10-14, 2016, pp. 1-154.
"Dynamic CSI Framework", 3GPP TSG-RAN WG1 Meeting #86, R1-167461, Agenda: 8.1.5, Ericsson, Aug. 22-26, 2016, 6 pages.
"Report of 3GPP TSG RAN WG2 meeting #95bis", 3GPP TSG-RAN WG2 Meeting #96, R2-167461, Agenda: 2.2, ETSI MCC, Nov. 14-18, 2016, pp. 1-196.
"Final Report of 3GPP TSG RAN WG1 #86 v1.0.0", 3GPP TSG RAN WG1 Meeting #87, R1-1611081, MCC Support, Nov. 14-18, 2016, pp. 1-160.
International Search Report and Written Opinion received for corresponding Patent Cooperation Treaty Application No. PCT/FI2017/050882, dated Apr. 10, 2018, 17 pages.
"General Considerations on Numerology-Specific Scheduling Request Design Options in NR", 3GPP TSG-RAN WG2 Meeting #98, R2-1704572, Agenda: 10.3.1.5, Samsung Electronics R&D Institute UK, May 15-19, 2017, 4 pages.
Extended European Search Report received for corresponding European Patent Application No. 17890597.2, dated Jul. 8, 2020, 10 pages.
"LCP with Multiple Numerologies", 3GPP TSG-RAN WG2 Meeting #96, R2-167575, Agenda : 9.2.1.2, Huawei, Nov. 14-18, 2016, 3 pages.
Office action received for corresponding Russian Patent Application No. 2019122891, dated Mar. 17, 2020, 7 pages of office action and 3 pages of translation available.

* cited by examiner

| 312: determining a mapping of a scheduling request to one or more logical channels configured for a user equipment |
|---|

| 314: in response to a received scheduling request, allocating an uplink radio resource such that a transmission time interval of the allocated uplink radio resource has a length corresponding to length of a transmission time interval configured for the mapped one or more logical channels |
|---|

| 316: receiving data on the allocated uplink radio resource |
|---|

FIG. 3B

| 322: transmitting a scheduling request mapped to one or more logical channels configured for a user equipment |
|---|

| 324: receiving an allocation of an uplink radio resource wherein a transmission time interval of the allocated uplink radio resource has a length corresponding to length of a transmission time interval configured for the mapped one or more logical channels |
|---|

| 326: sending data on the allocated uplink radio resource |
|---|

FIG. 3C

402: in response to determining that data is available for transmission, determining a logical channel with which the data is associated, where the determined logical channel is selected from among all logical channels currently configured for a user equipment at least one of which is configured with one or multiple transmission time intervals 404: using the determined logical channel to map to an uplink control channel for a scheduling request 406: sending on the uplink control channel the scheduling request that requests uplink radio resources on which to send the data

SCHEDULING REQUEST WITH DIFFERENT NUMEROLOGIES

RELATED APPLICATION

This application was originally filed as PCT Application No. PCT/FI2017/050882, filed on Dec. 13, 2017, which claims priority of U.S. Provisional Application No. 62/442,154, filed Jan. 4, 2017.

TECHNOLOGICAL FIELD

The described invention relates to wireless communications, and more particularly to the triggering and transmission of requests by a user equipment (UE) for radio resources. Such a request is commonly termed a scheduling request.

BACKGROUND

Acronyms used herein are listed below following the detailed description. Further advances in wireless communication are being developed for 3GPP New Radio (NR, commonly referred to as 5G) which is to provide high spectral efficiency and energy efficiency while reducing capital and operating expenditures as compared to currently deployed radio access systems. The 5G system is to operate in both low and high frequency bands, and is targeted to serve enhanced mobile broadband (eMBB) and massive machine-type communications (mMTC) with ultra-reliability and ultra-low latency (URLLC).

Figure 1:
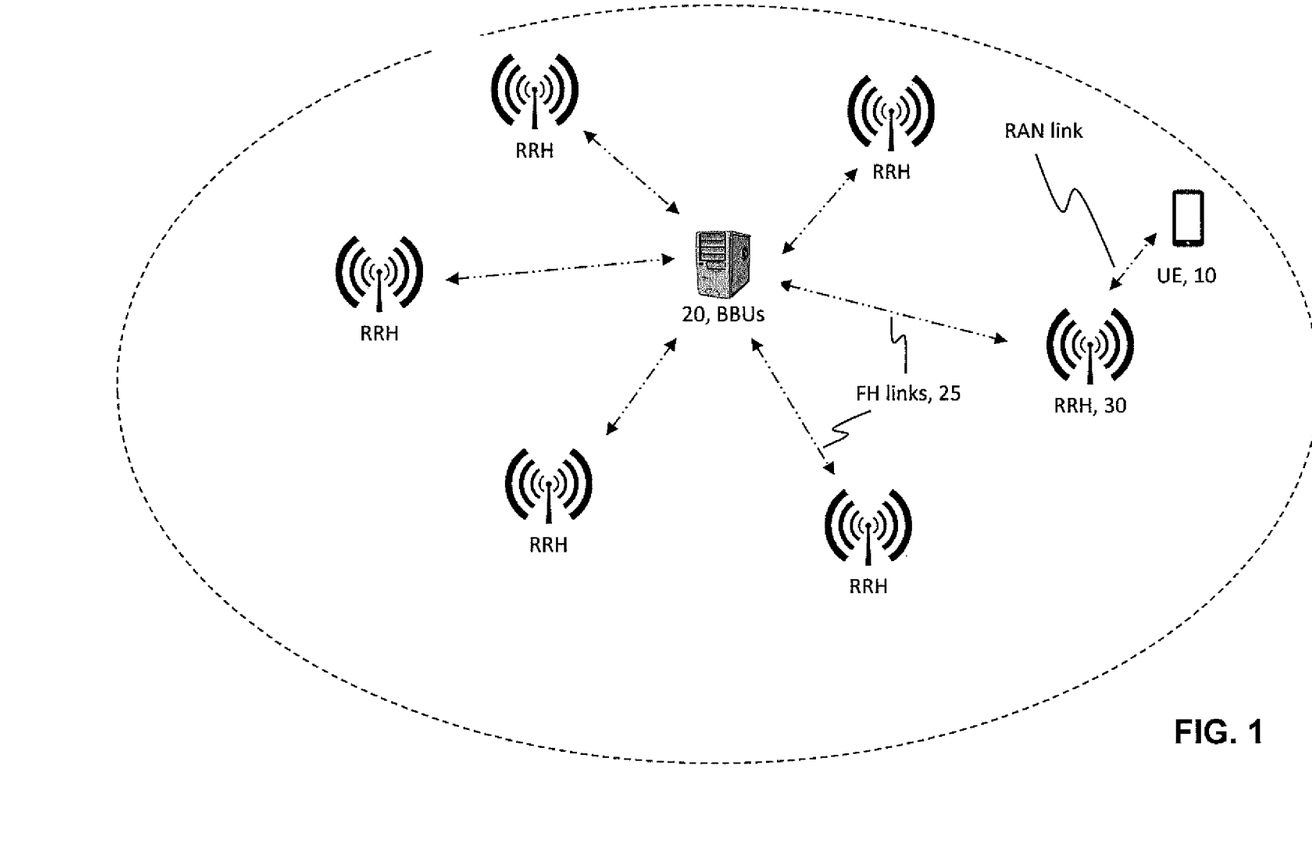
FIG. 1 is a schematic diagram illustrating an example radio environment in which embodiments of these teachings may be practiced.

FIG. 1 is a schematic overview of an example 5G radio environment in which these teachings may be deployed. Rather than a conventional cellular base station/eNB the 5G system is to have the conventional base station's functionality distributed among a baseband unit (BBU) 20 (which may be implemented as a single BBU or multiple interconnected BBUs) and one or typically multiple remote radio heads (RRHs) 30 each located up to a few kilometers from the BBU 20. Each RRH 30 is operationally connected to its BBU 20 via a wired or wireless bidirectional transmission link 25 referred to as a front haul (FH) link. Currently the BBU/RRH combination in 5G systems is referred to as a gNB. The illustrated UE 10 is in direct communication with the RRH 30, which in the 5G system would be operating as a transmission/reception point (TRP) of the gNB. The UE 10 may have active connections to more than one RRH 30, and relevant to these teachings it may simultaneously have multiple active logical channels with the one or more RRH 30 to which it has a radio connection. There is a somewhat similar distribution of access node functionality in cloud-based radio access networks (C-RAN) that are currently being deployed at least for some LTE-based networks, though those systems typically use a different terminology than BBU and RRH.

In conventional wireless networks such as LTE (also known as 4G) and WLAN there is at any given time in a given cell only one duration of a transmission time interval (TTI) and there is a prescribed number of symbol positions per TTI. When a UE has uplink data to send in the LTE system, for example when it is on an active voice call or interacting with a social media platform, the UE will send a scheduling request (SR) to its serving eNB on the PUCCH to which the eNB can respond with a PDCCH that allocates to the UE uplink radio resources on the PUSCH. Because SRs occur frequently when the UE's channel is active they are very short so as limit the amount of control signaling overhead they add. If the UE has uplink data but does not yet have a network connection or does not have uplink synchronization or is not configured with the SR resources on the PUCCH, the UE can send its SR via the LTE random access procedure it uses to obtain such a connection or uplink synchronization or the uplink radio resources for data transmission. These LTE procedures are detailed more particularly at 3GPP TS 36.321 and TS 36.331.

In the 5G system the UE may have multiple services with different delay requirement at once and these may utilize different TTI lengths with different numerologies or different numbers of symbols per TTI with one numerology. For example, a UE may have an eMBB service and a URLLC service running at the same time. In order to meet the requirements of those different services, they will be mapped to different logical channels and are configured with different numerologies. For instance, a longer TTI length is configured to the eMBB service to gain the very high throughput, as well as other TTI length as long as it meets the delay requirement. Meanwhile, a shorter TTI length is required for URLLC service to ensure the ultra-low latency. If one were to simply extend to 5G the SR procedures of LTE for this example the gNB would not know which of these two channels the UE's SR is directed to, or if the UE needs resources for both. Since they may have different TTI lengths and different numerologies (number of symbols per slot/subframe) it is not efficient that the gNB simply allocates resources according to LTE procedures and decide afterwards which service the UE's uplink data corresponds. Expanding the SR to explicitly inform the gNB the service to which it relates would add greatly to the control signaling overhead. Embodiments of these teachings are not limited to only the 5G system, but they do address the above problem of how to efficiently implement uplink SRs in a radio system in which a given UE may be configured to simultaneously operate with multiple numerologies and/or multiple TTI lengths.

The 3GPP organization is aware of the above SR issues and in this regard there are several references with relevant background to the solution presented herein.

Document RP-160671 entitled *New SID Proposal: Study on New Radio Access Technology* by NTT DOCOMO (3GPP TSG RAN Meeting #71; Goteborg, Sweden; 7-10 Mar. 2016). This study item agrees to develop a new radio (NR) access technology to meet a broad range of use cases including enhanced mobile broadband, massive MTC, critical MTC, and additional requirements defined during the RAN requirements study;

Document R2-168012 entitled *MAC with multiple numerologies/multiple TTI lengths* by Nokia, Alcatel-Lucent and Shanghai Bell (3GPP TSG RAN Meeting #96; Reno, USA; 14-18 Nov. 2016). This proposes to study MAC impact to support multiple service verticals operating simultaneously on different carriers/PHY numerologies;

Document R2-168531 entitled *MAC entities to support multiple NR verticals* by Intel Corporation (3GPP TSG RAN Meeting #96; Reno, USA; 14-18 Nov. 2016). This is to study if the LTE BSR mechanism can support multiple service verticals operating concurrently on different carriers;

Document R2-168175 entitled *MAC Aspects to Support Multiple Service Verticals* by Samsung Electronics Co., Ltd (3GPP TSG RAN Meeting #96; Reno, USA; 14-18 Nov. 2016). This is to study mechanisms for seamless connectivity and mobility procedures for concurrent operation of multiple service verticals in different carriers;

Document R1-1608562 entitled *Final Report of 3GPP TSG RAN WG1 #86 v1.0.0* (3GPP TSG RAN1 Meeting #86bis; Lisbon, Portugal; 10-14 Oct. 2016);

Document R1-167461 entitled *Dynamic CSI Framework* by Ericsson (3GPP TSG RAN WG1 #86; Goteburg, Sweden; 22-26 Aug. 2016);

Document R1-1611081 entitled *Final Report of 3GPP TSG RAN WG1 #86bis v1.0.0* (3GPP TSG RAN WG1 Meeting #87; Reno, USA, 14-18 Nov. 2016); and Skeleton Report by ETSI MCC (3GPP TSG RAN2 Meeting #96; Reno, USA; 14-18 Nov. 2016).

Additionally, specifications as currently developed for the 5G system can be found at http://5gtf.org/ and http://www.kt.com/eng/biz/kt5g_02.jsp. These support an option where the eNB may schedule an SR via PUCCH to be transmitted by the UE (with or without multiplexing other control information). It is assumed that such SR scheduling could also be adopted for NR/5G systems as well, provided the multi-TTI and multi-numerology issues mentioned above can be addressed.

BRIEF SUMMARY

In an example of an embodiment, a method is disclosed that includes determining a mapping of a scheduling request to one or more logical channels configured for a user equipment; in response to a received scheduling request, allocating an uplink radio resource such that a transmission time interval of the allocated uplink radio resource has a length corresponding to length of a transmission time interval configured for the mapped one or more logical channels; and receiving data on the allocated uplink radio resource.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determining a mapping of a scheduling request to one or more logical channels configured for a user equipment; in response to a received scheduling request, allocating an uplink radio resource such that a transmission time interval of the allocated uplink radio resource has a length corresponding to length of a transmission time interval configured for the mapped one or more logical channels; and receiving data on the allocated uplink radio resource.

In another example of an embodiment, an apparatus comprises means for determining a mapping of a scheduling request to one or more logical channels configured for a user equipment; in response to a received scheduling request, means for allocating an uplink radio resource such that a transmission time interval of the allocated uplink radio resource has a length corresponding to length of a transmission time interval configured for the mapped one or more logical channels; and means for receiving data on the allocated uplink radio resource.

In an example of an embodiment, a method is disclosed that includes transmitting a scheduling request mapped to one or more logical channels configured for a user equipment; receiving an allocation of an uplink radio resource wherein a transmission time interval of the allocated uplink radio resource has a length corresponding to length of a transmission time interval configured for the mapped one or more logical channels; and sending data on the allocated uplink radio resource.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: transmitting a scheduling request mapped to one or more logical channels configured for a user equipment; receiving an allocation of an uplink radio resource wherein a transmission time interval of the allocated uplink radio resource has a length corresponding to length of a transmission time interval configured for the mapped one or more logical channels; and sending data on the allocated uplink radio resource.

In another example of an embodiment, an apparatus comprises means for transmitting a scheduling request mapped to one or more logical channels configured for a user equipment; means for receiving an allocation of an uplink radio resource wherein a transmission time interval of the allocated uplink radio resource has a length corresponding to length of a transmission time interval configured for the mapped one or more logical channels; and means for sending data on the allocated uplink radio resource.

In an example of an embodiment, a method is disclosed that includes in response to determining that data is available for transmission, determining a logical channel with which the data is associated, where the determined logical channel is selected from among all logical channels currently configured for a user equipment at least one of which is configured with one or multiple transmission time intervals; using the determined logical channel to map to an uplink control channel for a scheduling request; and sending on the uplink control channel the scheduling request that requests uplink radio resources on which to send the data.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: in response to determining that data is available for transmission, determining a logical channel with which the data is associated, where the determined logical channel is selected from among all logical channels currently configured for a user equipment at least one of which is configured with one or multiple transmission time intervals; using the determined logical channel to map to an uplink control channel for a scheduling request; and sending on the uplink control channel the scheduling request that requests uplink radio resources on which to send the data.

In another example of an embodiment, an apparatus comprises in response to determining that data is available for transmission, means for determining a logical channel with which the data is associated, where the determined logical channel is selected from among all logical channels currently configured for a user equipment at least one of which is configured with one or multiple transmission time intervals; means for using the determined logical channel to map to an uplink control channel for a scheduling request; and means for sending on the uplink control channel the scheduling request that requests uplink radio resources on which to send the data.

DETAILED DESCRIPTION

Embodiments of these teachings relate to the triggering and transmission of scheduling requests in a radio system. While the specific radio system in the examples below is 5G, this is only a non-limiting embodiment. More particularly, these teachings relate to how the UE triggers a SR to request a radio resource for its uplink data transmission when at least one logical channel is configured with multiple numerologies and/or TTI durations. These teachings may be deployed for all UEs in the 5G system; that is, they are not limited only to those times a given UE is configured with a channel that has multiple numerologies and/or multiple TTI lengths thought those are the instances in which the advantages of these teachings are most pronounced.

The concept of multiple numerologies and multiple TTI lengths per logical channel has been adopted during the current early-stage development of the 5G system, specifically during the TSG RAN WG2 Meeting #95bis (see document R2-167461; *Report of* 3*GPP TSG RAN WG*2 *meeting #95bis;* 3GPP TSG RAN WG2 meeting #96; Reno, US; 14-18 Nov. 2016). TTI is a parameter related to the encapsulation of data from higher layers into radio frames for transmission on the physical layer. TTI length is related to the size of data blocks passed from the higher layers, and is a minimum time to transmit all the bits of such data blocks after encoding and interleaving them for transmission. The TTI is defined as the shortest decodable transmission (the shortest period over which bit error rate can be validly estimated), since the entire block must be received in order to properly de-interleave and decode all of its bits. Longer TTIs facilitate fewer transmission errors due to longer interleaves, shorter TTIs facilitate more frequent feedback of error rates which enables more effective link adaptation as the channel conditions change. In LTE pre-Rel-14 a TTI is typically one subframe of duration 1 ms. Enhancement with shorter TTI is under discussion in 3GPP for LTE.

Figure 2:
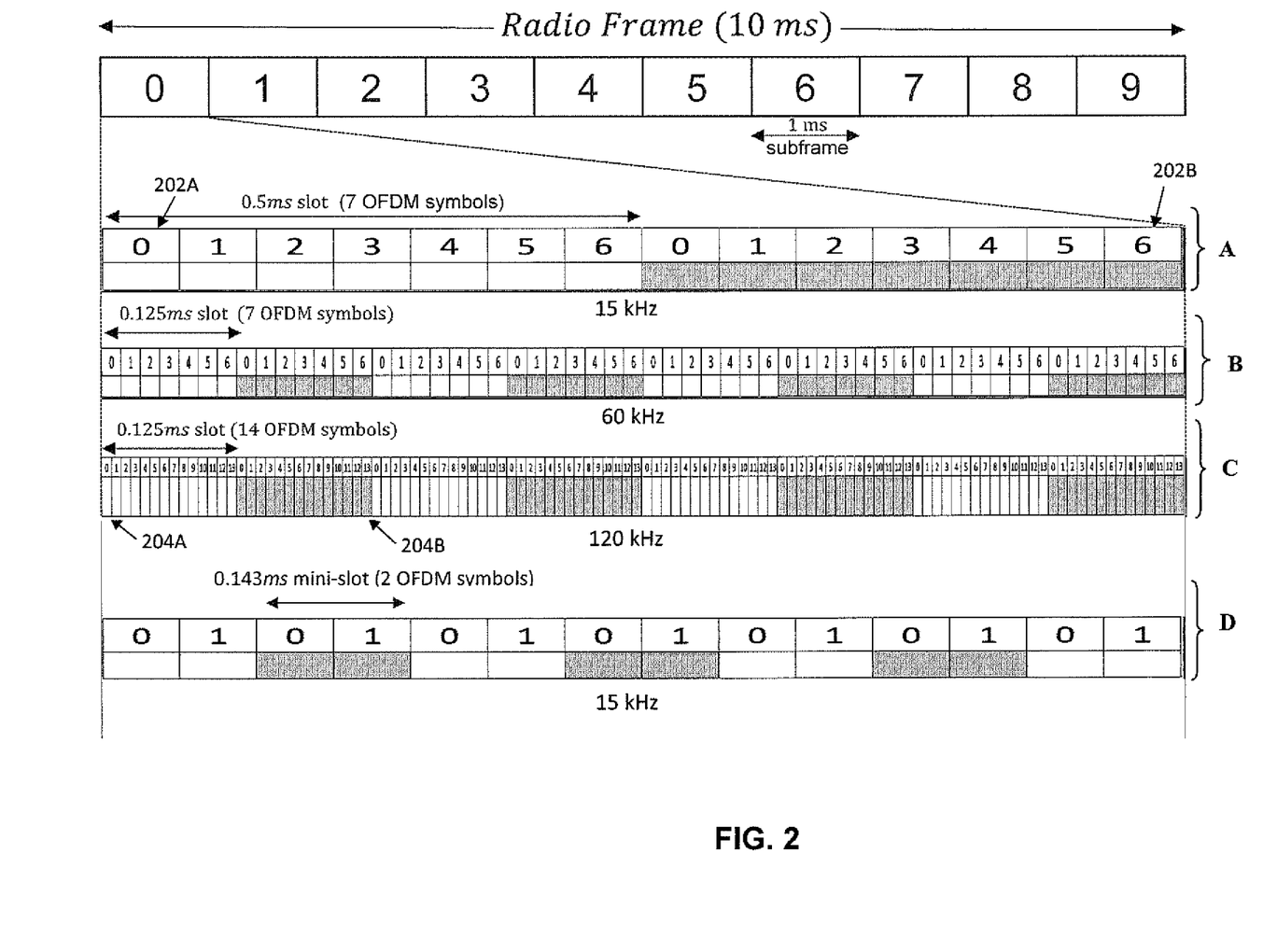
FIG. 2 illustrates one subframe of 1 ms duration taken from a 10 ms radio frame, and different TTI lengths with different numerologies (different subcarrier spacing) that may be used for that 1 ms subframe.

FIG. 2 is a diagram illustrating one radio frame and the 5G concepts of multiple TTIs and multiple numerologies. For LTE a given TTI of 1 ms is occupied by two slots of 0.5 ms and each slot defining 7 OFDM symbol positions as shown at row A of FIG. 2. In LTE pre-Rel-14 every single subframe of a given radio frame are identically defined, so for example the 2-slot, 7-symbols per slot numerology at row A must be repeated for every subframe.

Since TTI is defined as the shortest decodable transmission, so long as the network and the UE have a common understanding of what is the TTI length (since interleaving and coding are done in units of TTIs) it can be defined differently and in fact this is what 3GPP proposes to do for the 5G radio access technology. When the 5G network configures a UE with a given logical channel the network can also stipulate what is (are) the TTI(s) to be used for that channel, which unlike LTE can differ from the TTIs used by other UEs in the cell and in fact can differ from other TTIs on another logical channel in use by this same UE. Further, in 5G a given logical channel can take on one of multiple TTIs, for example a UE can be configured with a logical channel having TTI lengths {0.2 ms, 0.5 ms, 1 ms} such that one 10 ms radio frame may consist of ten 1 ms subframes and the next radio frame on that same channel may consist of fifty 0.2 ms subframes. It is also possible to have different TTI length for each subframe or different frequency resources on one subframe. In the 1 ms TTI subframe the bit interleaving and coding/compression can span as many transport blocks it takes to occupy that 1 ms TTI while in the 0.2 ms TTI frame the bit interleaving and coding can span only the number of transport blocks it takes to occupy that shorter 0.2 ms TTI.

5G also introduces the concept of multiple numerologies. Numerologies refers the arrangement and timing of symbols per slot, including the subcarrier spacing, cyclic prefix, TTI length, etc. In LTE pre REL-14 a slot is one half a subframe in duration, 0.5 ms; and is occupied by no more than 7 OFDM symbol positions as seen at row A of FIG. 2. Enhancements with shorter TTI with less OFDM symbols per TTI for LTE is also under discussion. In 5G this may be only one of several options. Row B of FIG. 2 shows each slot is still occupied by 7 OFDM symbols but the slot duration is 0.125 ms meaning a subframe consists of eight slots, different from the two slots of row A. Row C of FIG. 2 shows each slot is occupied by 14 OFDM symbols and like row B the slot duration is 0.125 ms so there are in a single 1 ms subframe under the row C numerology eight slots and 112 OFDM symbols. Row D of FIG. 2 illustrates a still different numerology in which the 1 ms subframe is occupied by seven mini-slots each consisting of only 2 OFDM symbols and each mini-slot spanning (approximately) 0.143 ms. The different extent of the OFDM symbols among the different rows at FIG. 2 reflects different subcarrier spacing.

5G makes it possible to have one channel configured for a UE follow the numerology of row A while another channel simultaneously configured for the same UE follows a different numerology, for example the numerology of row D, and it is also possible to configure multiple numerologies such as TTI length to be used for one logical channel. 5G may also adopt that the numerology can change within a given channel, either at the radio frame boundary or possibly even at the subframe boundary within any same radio frame in TDM manner or different numerology such as TTI length can be used on different resources in FDM manner. 5G further makes it possible to have different TTIs for different logical channels, and additionally to have multiple TTIs for the same logical channel. So for example a TTI length of 1.0 ms according to the numerology of row A enables a widest interleave represented by bits from symbol position 0 of the first slot (202A) interleaved with bits of symbol position 6 of the second slot (202B) while the next subframe (in the next or possibly even the same radio frame) can have a TTI length of 0.25 ms according to the numerology of row C which enables a widest interleave represented by bits from symbol position 0 of the first slot (204A) interleaved with bits of symbol position 13 of the second slot (204B).

Up to the RAN1 Meeting #86bis it was agreed that multiple numerologies shall be supported by a UE (FFS in the quote below indicates 'for further study').

Specification supports multiplexing numerologies in TDM and/or FDM within/across (a) subframe duration(s) from a UE perspective From network perspective, multiplexing of transmissions with different latency and/or reliability requirements for eMBB/URLLC in DL is supported by Using the same sub-carrier spacing with the same CP overhead FFS: different CP overhead Using different sub-carrier spacing FFS: CP overhead.

NR supports both approaches by specification

NR should support dynamic resource sharing between different latency and/or reliability requirements for eMBB/URLLC in DL.

It was further agreed at the RAN2 Meeting #95bis and RAN2 Meeting #96 that a radio bearer can be mapped to one or more numerology/TTI duration based on network configuration.

The eNB should have means to control which logical channels the UE may map to which numerology and/or TTIs with variable duration. Details FFS (e.g. whether semi-static or dynamic, hard split/soft split, etc)

A UE can support multiple numerologies from a single cell. FFS whether this is modelled as 1 or multiple MAC entities.

Thus the agreement in 3GPP is that a radio bearer can be configured by the network to be mapped to one or more numerology/TTI duration, but as yet in 3GPP there is no agreement on the following which are for further study:

Whether a single MAC entity can support one or more numerology/TTI durations (modelling issue), Whether a single logical channel can be mapped to one or more numerology/TTI duration, and Whether a single HARQ entity can support one or more numerology/TTI duration The physical layer in the 5G system is designed to support different numerologies (such as different TTI lengths and subcarrier spacing, see FIG. 2), with slot and mini-slot to meet the requirements of different services/applications. For example, the UE may operate using a 0.2 ms TTI length to fulfill the ultra-low latency for URLLC services, and with a relaxed 1.0 ms TTI length for eMBB services. As mentioned above, it is under discussion whether 5G will also adopt the possibility to configure one logical channel with multiple numerologies such as multiple TTI lengths.

The problem is how such a UE, configured with multiple logical channels with differing TTIs and/or other different numerologies, is to send a SR when it needs to request uplink resources for a new transmission on one of those channels or even more than one of them. While some of the references mentioned in the background section above discuss the MAC impact due to multiple numerologies such as multiplexing, logical channel mapping/prioritization, UL grant, BSR and HARQ, none of them are seen to discuss details of the SR. Embodiments of these teachings resolve the question of which channel is the subject of the scheduling request, particularly for when the UE is configured with one or multiple different numerologies corresponding to different TTI lengths or is configured with different TTI lengths with the remaining numerology such as subcarrier spacing being the same.

According to an example embodiment, when the UE has UL data available for transmission and this data is only for one logical channel, this triggers the UE to send an SR on the longest TTI length or the numerology corresponding to the longest TTI length associated with this logical channel. When UL data for several logical channels becomes available for transmission from this UE, there are two different implementations and which of these is active at any given time may depend on the network configuration. In a first implementation of data for multiple uplink channels, the SRs for these channels are triggered separately for the data transmission in the respective logical channels, and for each logical channel the SR is sent as above for the case of data for a single logical channel. In a second implementation of data for multiple uplink channels, there is one SR and it is sent using the shortest TTI length among the longest TTI lengths that are configured for the multiple logical channels on which resources are being requested.

As an alternative embodiment, the UE can use the first SR occasion after the data becomes available for transmission of any TTI length that is configured to the logical channel that triggered the SR (the channel for which the uplink data is to be sent). In this case the gNB could know which logical channel triggered the SR based on a later BSR report from this same UE. The network can configure for its own UEs whether to use this alternative or the example embodiment above, or the choice of which to use can be made to depend on the number of logical channels configured for a given UE. For instance, if for a given UE only one logical channel is configured (in addition to the SRB), that first SR occasion can always be used for its SR and whenever more than one logical channel is configured for this UE the embodiments above could be used for the SR instead.

If the UE uses that first SR occasion of any TTI length configured to the logical channel whose data triggered the SR, the network/gNB would not always be able to distinguish which logical channel triggered the SR without some additional bit or bits indicating the specific channel. But still the network can schedule the granted uplink resources using the TTI length of the received SR. Unlike the embodiment above the network would not be able to select a shorter TTI length than that on which the SR was received (except for the special case in which there is only one channel configured to the UE with that TTI length), but still the UE would be able to obtain a grant of uplink resources that is suitable for the data it has that is available/ready to transmit. In one example implementation, in this case the network could always attempt to schedule with shorter TTI length than that on which the SR was received to overcome the possible ambiguity.

For all of the above, the SR itself may or may not expand to fill the entire TTI length on which it is sent. For example, if the SR itself occupies only 1 or 2 OFDM symbols and this SR is sent in a TTI that spans 4 OFDM symbols, the remaining 2 or 3 symbols in that TTI that are not utilized for the SR itself can be used for other control information or data, or they may be left unused.

Whenever the network explicitly schedules an SR (via the PUCCH) for a certain numerology, the network can indicate in the scheduling grant itself the TTI length for which the SR is valid. This can be deployed as an alternative to any of the above embodiments, or in addition to any of them for the special case of the network's explicit scheduling of an SR.

The above assume the UE is configured with one or more logical channels with different TTI lengths/durations. The network configures these channels for the UE via signaling, and this configuration signaling can either a) configure for each logical channel all the usable numerologies such as all the usable TTI durations separately or configure a restriction of which numerologies/TTIs are not usable for a certain logical channel (default is all the resources with different TTI length/numerology can be used for a logical channel unless a restriction is configured); or b) only configure explicitly the numerology/TTI length with the longest TTI duration which will implicitly configure all other numerologies with shorter TTIs. Both the network and the UEs will then have a common understanding of what TTIs and numerologies are usable for any given logical channel as these are to be published in the relevant radio access technology standards.

To better explain these teachings consider some specific examples which assume a UE is configured with three logical channels at the same time: LCH #1 (LCH=logical channel) is an eMBB service configured with three TTI lengths or numerologies corresponding to those TTI lengths; LCH #2 is a URLLC application requiring only the shortest TTI length; and LCH #3 also has a certain latency requirement but this is not as strict as URLLC. Specifically, the usable TTI lengths (and corresponding numerology) for these channels is then:

LCH #1: [0.2 ms, 0.5 ms, 1 ms]
LCH #2: [0.2 ms]
LCH #3: [0.2 ms, 0.5 ms]

In a first example assume the SR is triggered by uplink data for LCH #1 being available for transmission by the UE. In this regard the data being 'available for transmission' may be considered as arrival of the data at the UE's transmit buffer. The UE would send the SR using the 1 ms TTI since this is the longest TTI configured for the channel (LCH #1) on which the data is to be sent. This may or may not be the first SR occasion after data arrival in the transmit buffer, the salient point is that the SR is sent on the PUCCH resources that are configured for the 1.0 ms TTI length. Whether some other PUCCH (SR occasion) configured for the 0.5 ms or 0.2 ms TTI lengths passes or not is not relevant for this embodiment and this example. Upon receiving the SR on the PUCCH resources configured for the 1.0 ms TTI, the network knows the SR is asking uplink resources for LCH #1. If the network decides to allocate such resources as will typically be the case, the network is not constrained to the 1.0 ms TTI length but could allocate the requested UL resources using any of the TTI lengths equal or less than 1 ms, and in this case the UL grant itself can indicate whether the granted/allocated radio resources are 1.0 ms, 0.5 ms or 0.2 ms TTI.

In a second example assume the SR is triggered by uplink data for LCH #2 being available for transmission by the UE. There is only one TTI length 0.2 ms configured for LCH #2 and so it is necessarily the longest, meaning the UE would send the SR using the 0.2 ms TTI. The network will receive this SR on the PUCCH resources configured for 0.2 ms TTI length, but in these examples this UE is configured with three LCHs that are configured for the 0.2 ms TTI length. There is no confusion on the network's part as to which LCH this SR corresponds because the rule stated above is that the SR is sent on the longest TTI configured for the corresponding channel, and 0.2 ms is the longest TTI for this UE only for LCH #2. The network thus could allocate the requested UL resources using any of the TTI lengths equal or less than 0.2 ms but since for LCH #2 this TTI length is the only option the network will allocate the requested resources only using a 0.2 ms TTI length. Again, the UL grant itself could indicate the 0.2 ms TTI.

A third example assumes there is uplink data available for transmission by the UE for multiple logical channels, namely LCH #1 and LCH #2. For this example assume the configuration in the network is that the data for these LCHs will trigger separate SRs. The longest TTI length for LCH #1 is 1.0 ms and the longest TTI length for LCH #2 is 0.2 ms, so the UE will send one SR in the PUCCH configured for 1.0 ms TTI and the other SR on the PUCCH configured for 0.2 ms TTI. Upon receiving these two SRs from the same UE the network will understand the UE is asking for uplink resources on two different services, and will map the one SR on the 1.0 ms TTI to the LCH #1 and the other SR on the 0.2 ms TTI to the LCH #2. Consequently the network will allocate uplink resources on both 1.0 ms TTI and 0.2 ms TTIs on the uplink shared channel(s) for the UE to send this data for the two different services.

Like the third, this fourth example also assumes there is uplink data available for transmission by the UE for multiple logical channels, again this example uses LCH #1 and LCH #2 but for this example assume the configuration in the network is that the data for these LCHs will trigger one SR that maps to the shortest TTI length among all the longest TTI lengths configured for all the channels underlying the request. The longest TTI for LCH #1 is 1.0 ms and the longest TTI for LCH #2 is 0.2 ms; the shortest of these is 0.2 ms and so the UE will send one SR on the PUCCH that uses the 0.2 ms TTI length. Upon reception of this SR the network understands the UE has at least uplink data requiring a 0.2 ms TTI length. The network does not know for certain from this SR alone whether the UE has data for LCH #2 only, data for both LCH #1 and LCH #2, data for both LCH #2 and LCH #3, or data for each of LCH #1, LCH #2 and LCH #3. But that does not prevent the network from fulfilling the requested allocation; the network will allocate to the UE uplink resources with at least 0.2 ms TTI length and if one reviews all the four possible options immediately above one will see the UE can send its data regardless of what channel(s) or service(s) actually underlie the SR the UE transmitted.

A fifth example similarly assumes there is uplink data available for transmission by the UE for one or multiple logical channels, but in this case it is further assumed that the alternative embodiment mentioned above is in use, namely that the UE sends its SR on the first-available SR occasion of any TTI length configured to the logical channel whose data triggered the SR. If data for only LCH #1 triggered the UE to send an SR, then the UE can send this SR on whichever PUCCH next occurs that has either a 1.0 ms, 0.5 ms or 0.2 ms TTI length. Upon reception of the SR, the network does not have the information of which LCH triggered this SR. If it happens that the UE's next available PUCCH uses TTI length 0.2 ms, the network will get the SR in a 0.2 ms TTI and from this information cannot even narrow which of the three LCHs configured for this UE the SR is for. It is enough information for scheduling purposes though because the network need only allocate uplink resources having a 0.2 TTI length.

For any of the above examples the channels may be formally grouped such that the UE's logical channel allocations are in logical channel groups. In this case the individual channels in the above examples can be replaced with logical channel groups.

Embodiments of these teachings provide a technical effect of enabling a signalling-efficient way to indicate the scheduling request for the case of multiple numerologies/TTIs so as to ensure the proper numerology could be applied in the grant/allocation from the network of uplink resources on which the UE is to send its data. Another technical effect is that these teachings enable leveraging of the status report indication for the new radio access technology being developed by the 3GPP.

Figure 3A:
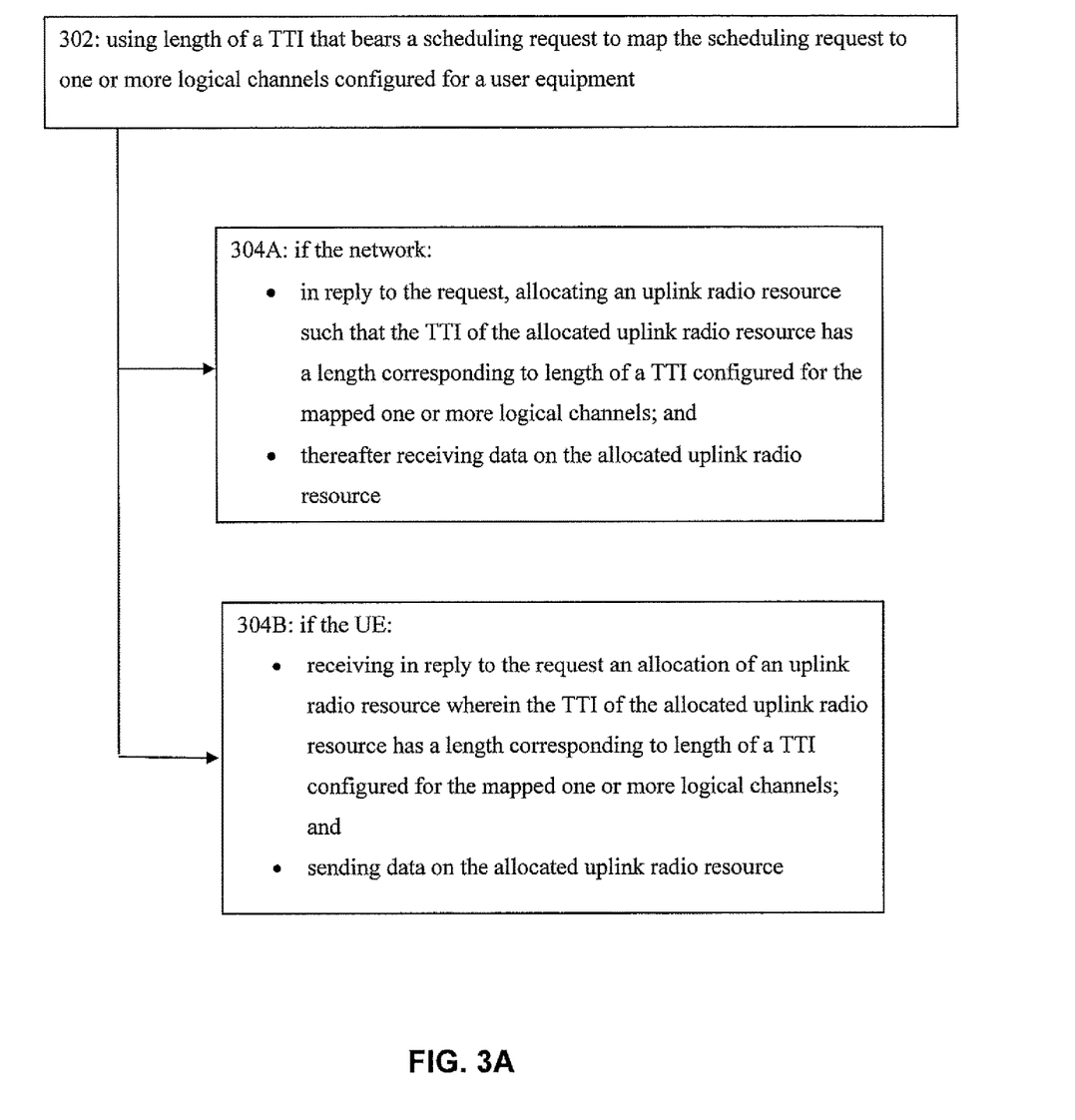
FIGS. 3A-3C are process flow diagrams in accordance with exemplary embodiments.

FIG. 3A is a process flow diagram that summarizes some of the above aspects of these teachings. In essence there is a mapping between the TTI that bears the SR and the TTI of the UEs logical channel (or channels in the case of one SR requesting resources for multiple logical channels). Block 302 states this general principle: using length of a TTI that bears a scheduling request to map the scheduling request to one or more logical channels configured for a user equipment. If it is the network doing the mapping of block 302 the mapping is from the TTI that bears the SR to the one or more logical channels; if it is the UE doing the mapping of block 302 the mapping is from the one or more logical channels for which it has data to send to find the TTI that will bear the SR the UE will transmit.

If it is the network performing block 302 then block 304A applies: in reply to the request the network allocates an uplink radio resource such that the TTI of the allocated uplink radio resource has a length corresponding to length of a TTI that is configured for the one or more logical channels that are mapped at block 302, and thereafter the network receives data on the allocated uplink radio resource. In the 5G system this may be performed by the gNB, but more generally it is performed by the radio access node of any generic wireless network. In one implementation detailed above, if the relevant logical channel is configured with multiple TTIs for this UE the network will allocate an uplink radio resource with the shortest TTI of those configured multiple TTIs, to the extent the network is able to do so. So for example if in the above examples the network receives the SR in a 1.0 ms TTI it knows the UE's data is for only LCH #1 which has TTI lengths {0.2 ms, 0.5 ms, 1.0 ms} configured for this UE. The network will try to allocate an uplink resource with TTI length 0.2 ms, and if this is not possible will then try to allocate an uplink resource with TTI length 0.5 ms, and only if neither of those is possible will it allocate an uplink resource with TTI length 1.0 ms.

If instead it is the UE performing block 302 then block 304B applies: in reply to the request the UE receives an allocation of an uplink radio resource wherein the TTI of the allocated uplink radio resource has a length corresponding to length of a TTI that is configured for the one or more logical channels that is mapped at block 302, and thereafter the UE sends data on the allocated uplink radio resource.

Some of the above examples had the scheduling request mapping to only one logical channel that is configured for the UE. In this case, using length of the TTI that bears the scheduling request to map the scheduling request at block 302 will be a mapping to the only one logical channel, and in more detail this mapping comprises matching the length of the TTI that bears the scheduling request to a longest TTI configured for that 'only one' logical channel that is configured for the user equipment. Those examples had this logical channel being configured with multiple TTI lengths for the user equipment, but these examples will work equally well if for example that particular channel were configured for this UE with only one TTI length. This is not to say the allocated resources can only have a TTI length matching that TTI bearing the SR; the 'length corresponding' term in blocks 304A and 304B is chosen to capture the above examples where the length of the TTI of the allocated uplink radio resource is restricted to those of the multiple TTI lengths that are no longer than the TTI that bears the scheduling request. So for example if the channel is configured with TTI lengths [1.0, 0.5, 0.2] and the SR is sent on a TTI of length 0.5, the network can allocate resources with a 0.5 ms or a 0.2 ms TTI and both choices would be consistent with FIG. 3A.

Many of the above examples had each scheduling request that maps per FIG. 3A as mapping to exactly one logical channel configured for the UE. But this was not always true in other examples—for example one scheduling request could map to (at least) a first and a second logical channel configured for the user equipment, in which case using length of the TTI that bears the scheduling request to map the scheduling request as block 302 states would be mapping it to the (at least) first and second logical channels and this was implemented by matching the length of the TTI that bears the SR to a shortest one of the longest lengths of TTIs configured for those (at least) first and second logical channels.

For any of these examples the reply of blocks 304A and 304B, the one that allocates the uplink radio resource, explicitly identifies length of the TTI of the allocated uplink radio resource.

FIG. 3A and the above more specific examples and implementations may be considered as a method practiced by the network or the UE as described. In other embodiments of these teachings there may be a computer readable memory storing computer program instructions that, when executed by one or more processors of a host device such as a network access node (which itself may be distributed as in a gNB) or a UE, cause the host device to perform as described above for FIG. 3A. In a further implementation the invention may be embodied as an apparatus comprising at least one memory storing computer program instructions and at least one processor. In such a case the at least one memory with the computer program instructions is configured with the at least one processor to cause the apparatus to perform actions as detailed above for FIG. 3A and the various more specific examples.

Figure 3B:
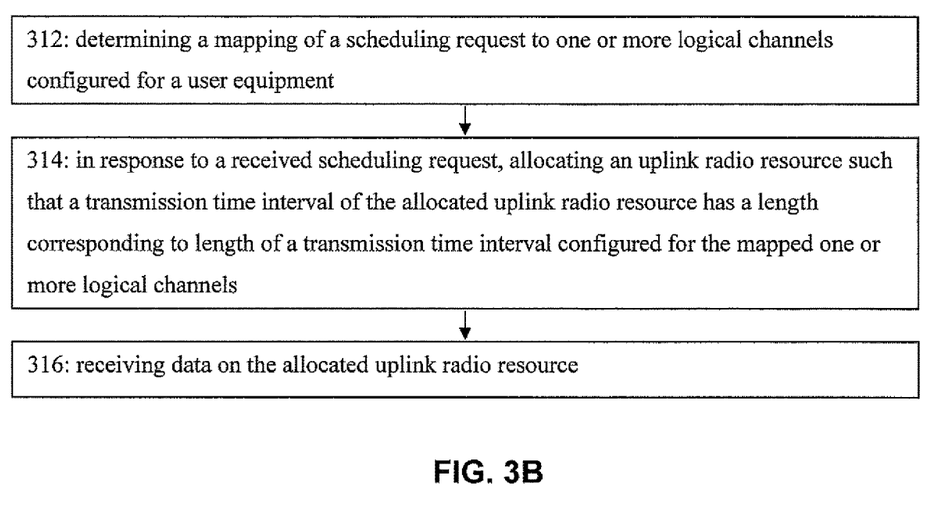

FIG. 3B is a process flow diagram in accordance with an example embodiment that is more specifically related to a user equipment. This figure further illustrates the operation of an exemplary method practiced by a user equipment such as UE 10 for example. In other embodiments of these teachings there may be a computer readable memory storing computer program instructions that, when executed by one or more processors of a host device such as a UE 10, cause the host device to perform the blocks in FIG. 3B. In a further implementation the invention may be embodied as an apparatus comprising at least one memory storing computer program instructions and at least one processor. In such a case the at least one memory with the computer program instructions is configured with the at least one processor to cause the apparatus to perform the blocks shown in FIG. 3B. The mapping may be configured for the user equipment by a radio access network.

Referring to FIG. 3B, an example method may include determining a mapping of a scheduling request to one or more logical channels configured for a user equipment as indicated by block 312; in response to a received scheduling request, allocating an uplink radio resource such that a transmission time interval of the allocated uplink radio resource has a length corresponding to length of a transmission time interval configured for the mapped one or more logical channels as indicated by block 314; and receiving data on the allocated uplink radio resource as indicated by block 316.

Figure 3C:
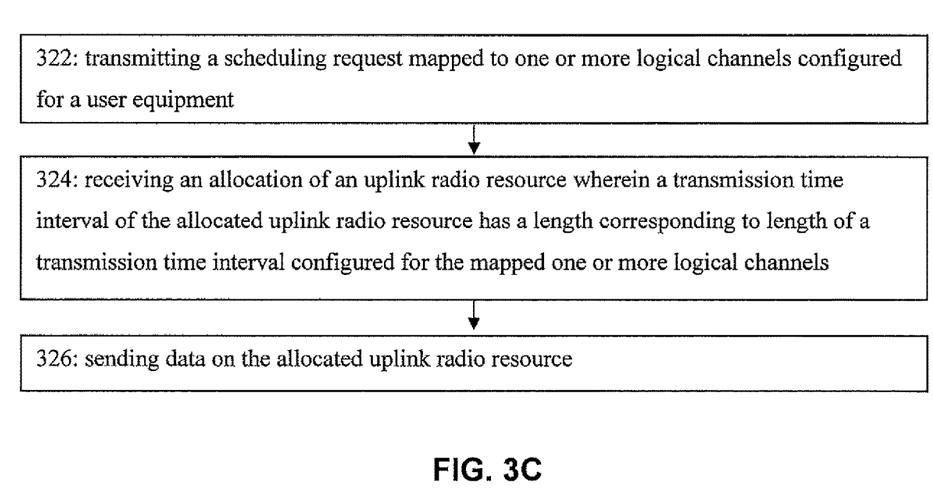
Figure 5:
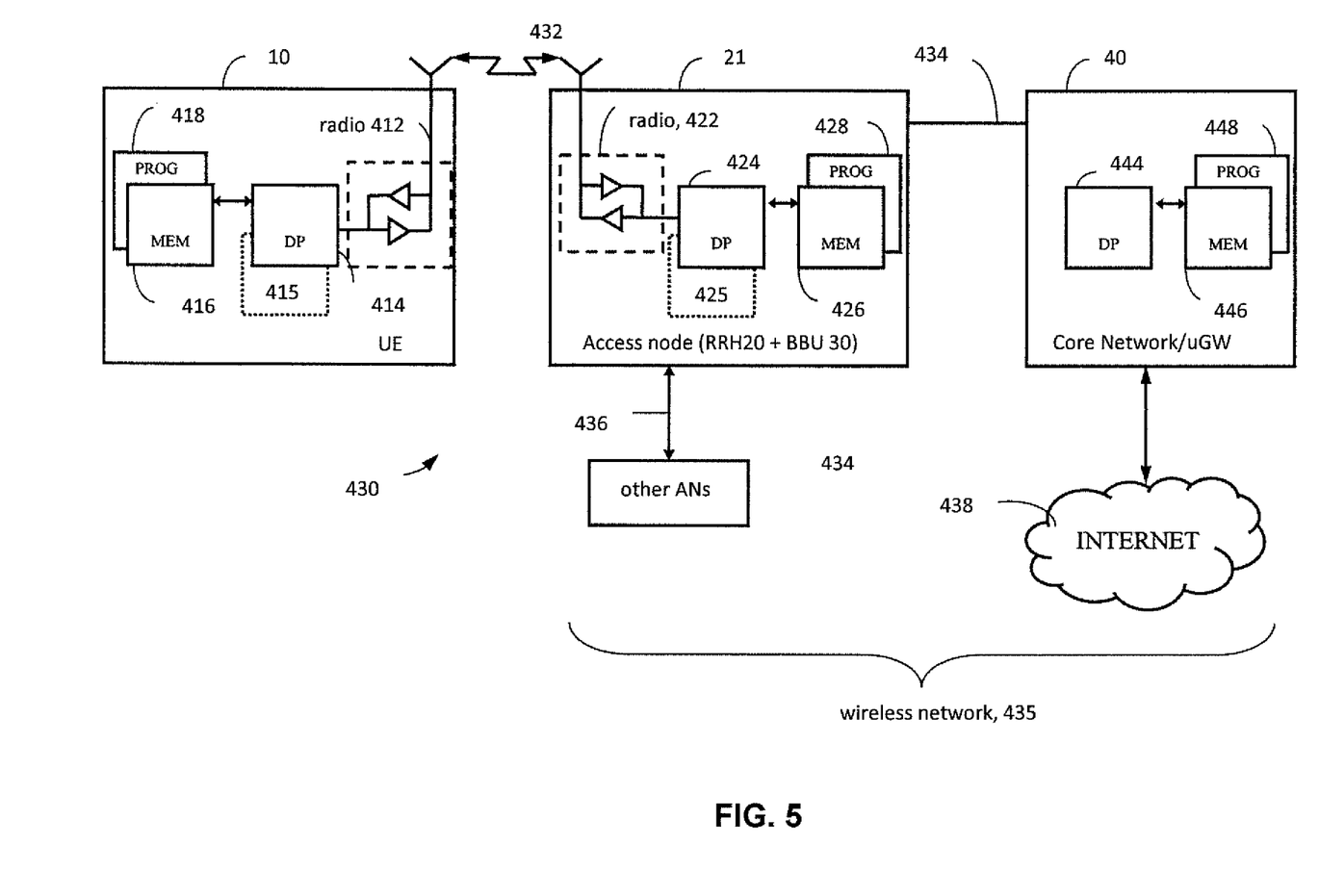
FIG. 5 is a high level schematic block diagram illustrating certain apparatus/devices that are suitable for practicing certain of these teachings.

FIG. 3C is a process flow diagram in accordance with an example embodiment that is more specifically related to a network access node of a wireless network (such as wireless network 435 in FIG. 5 for example). This figure further illustrates the operation of an exemplary method practiced by a network access node. In other embodiments of these teachings there may be a computer readable memory storing computer program instructions that, when executed by one or more processors of a host device, cause the host device to perform the blocks in FIG. 3C. In a further implementation the invention may be embodied as an apparatus comprising at least one memory storing computer program instructions and at least one processor. In such a case the at least one memory with the computer program instructions is configured with the at least one processor to cause the apparatus to perform the blocks shown in FIG. 3C.

Referring to FIG. 3C, an example method may include transmitting a scheduling request mapped to one or more logical channels configured for a user equipment as indicated by block 322; receiving an allocation of an uplink radio resource wherein a transmission time interval of the allocated uplink radio resource has a length corresponding to length of a transmission time interval configured for the mapped one or more logical channels as indicated by block 324; and sending data on the allocated uplink radio resource as indicated by block 326.

The example methods described above with reference to FIGS. 3B-3C may also include one or more of the following features. The length of the transmission time interval that bears the scheduling request may be mapped to the length of the transmission time interval of the one or more logical channels configured for the user equipment. The scheduling request may map to one logical channel configured for the user equipment; and the length of the transmission time interval that bears the scheduling request may be mapped to the only one logical channel such that the length of the transmission time interval that bears the scheduling request is matched to a longest transmission time interval configured for the one logical channel that is configured for the user equipment. The only one logical channel may be configured with one or multiple transmission time interval lengths for the user equipment. The length of the transmission time interval of the allocated uplink radio resource may be restricted to those of the one or multiple transmission time interval lengths that are no longer than the transmission time interval that bears the scheduling request. Each logical channel may map to at most one scheduling request configured for the user equipment. The scheduling request may map to at least a first and a second logical channel configured for the user equipment; and the length of the transmission time interval that bears the scheduling request may be mapped to the at least first and second logical channels such that the length of the transmission time interval that bears the scheduling request is matched to a shortest one of the longest lengths of transmission time intervals configured for the at least first and second logical channels that are configured for the user equipment. The allocation of the uplink radio resource may explicitly identify length of the transmission time interval of the allocated uplink radio resource.

According to another example, a computer program is provided comprising program code for executing a method in accordance with FIGS. 3B and 3C. The computer program may include a computer program product comprising a computer-readable medium bearing computer program code embodied therein for use with a computer.

According to another example, an apparatus may comprise means for performing a method in accordance with FIGS. 3B and 3C.

According to another example, an apparatus may comprise at least one memory storing computer program instructions; and at least one processor; wherein the at least one memory with the computer program instructions is configured with the at least one processor to cause the apparatus to perform a method in accordance with FIGS. 3B and 3C.

Figure 4:
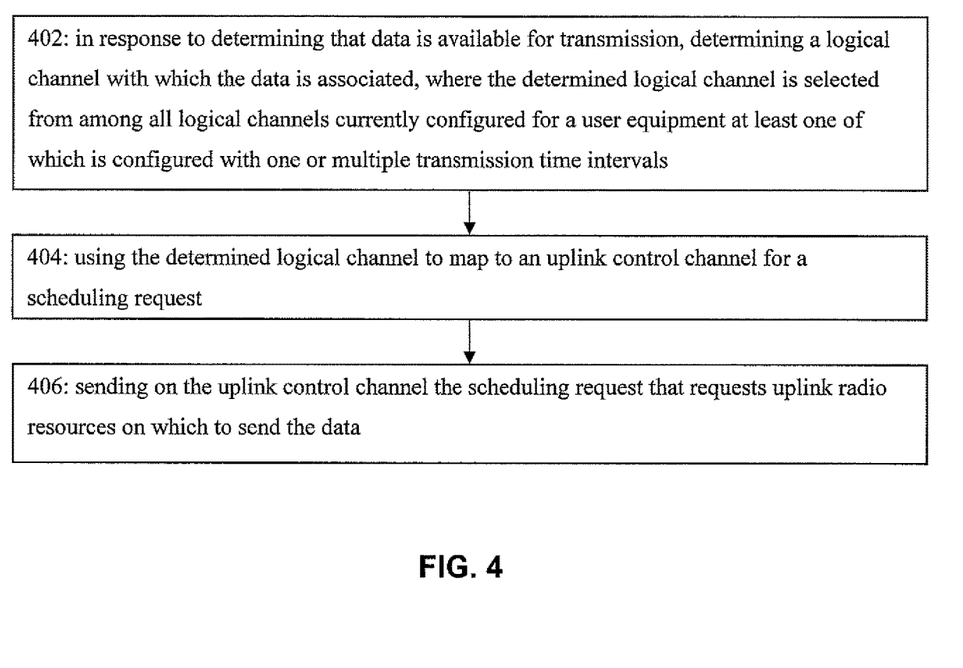
FIG. 4 is a further process flow diagram in accordance with an example embodiment.

FIG. 4 is a logic flow diagram in accordance with an example embodiment. This figure further illustrates the operation of an exemplary method practiced by a user equipment such as UE 10 for example. In other embodiments of these teachings there may be a computer readable memory storing computer program instructions that, when executed by one or more processors of a host device such as a UE 10, cause the host device to perform the blocks in FIG. 4. In a further implementation the invention may be embodied as an apparatus comprising at least one memory storing computer program instructions and at least one processor. In such a case the at least one memory with the computer program instructions is configured with the at least one processor to cause the apparatus to perform the blocks shown in FIG. 4.

Referring to FIG. 4, an example method may include in response to determining that data is available for transmission, determining a logical channel with which the data is associated, where the determined logical channel is selected from among all logical channels currently configured for a user equipment at least one of which is configured with one or multiple transmission time intervals as indicated by block 402; using the determined logical channel to map to an uplink control channel for a scheduling request as indicated by block 404; and sending on the uplink control channel the scheduling request that requests uplink radio resources on which to send the data as indicated by block 406. The configured transmission time interval of the determined logical channel may be used to map to the uplink control channel for the scheduling request. The mapping between the determined logical channel and the uplink control channel for the scheduling request may be configured by to network.

According to another example, a computer program is provided comprising program code for executing a method according to the preceding paragraph. The computer program may include a computer program product comprising a computer-readable medium bearing computer program code embodied therein for use with a computer.

According to another example, an apparatus may comprise means for performing the method according to FIG. 4.

According to another example, an apparatus may comprise at least one memory storing computer program instructions; and at least one processor; wherein the at least one memory with the computer program instructions is configured with the at least one processor to cause the apparatus to perform the method according to FIG. 4.

FIG. 5 is a high level diagram illustrating some relevant components of various communication entities that may implement various portions of these teachings, including a base station identified generally as a radio network access node 21 (shown at FIG. 1 as the RRH 20 plus the BBU 30), a core network which may also be co-located with a user-plane gateway (uGW) 40, and a user equipment (UE) 10. In the wireless system 430 of FIG. 5 a communications network 435 is adapted for communication over a wireless link 432 with an apparatus, such as a mobile communication device which may be referred to as a UE 10, via a radio network access node 21. The core network 435 may include a Serving- or User-GW 40 that provides connectivity with other and/or broader networks such as a publicly switched telephone network and/or a data communications network (e.g., the internet 438).

The UE 10 includes a controller, such as a computer or a data processor (DP) 414 (or multiple ones of them), a computer-readable memory medium embodied as a memory (MEM) 416 (or more generally a non-transitory program storage device) that stores a program of computer instructions (PROG) 418, and a suitable wireless interface, such as radio frequency (RF) transceiver or more generically a radio 412, for bidirectional wireless communications with the radio network access node 21 via one or more antennas. In general terms the UE 10 can be considered a machine that reads the MEM/non-transitory program storage device and that executes the computer program code or executable program of instructions stored thereon. While each entity of FIG. 5 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 21 also includes a controller, such as a computer or a data processor (DP) 424 (or multiple ones of them), a computer-readable memory medium embodied as a memory (MEM) 426 that stores a program of computer instructions (PROG) 428, and a suitable wireless interface, such as a RF transceiver or radio 422, for communication with the UE 10 via one or more antennas. The radio network access node 21 is coupled via a data/control path 434 to the core network 40. In other 5G deployments prior to the point 5G can stand alone it may be that the gNB 21 is coupled to an eNB of a LTE system in what is currently contemplated as a NR-LTE interworking arrangement, in which case the core network is likely to be the eNB's. However deployed, the radio network access node 21 may also be coupled to other radio network access nodes via data/control path 436.

The core network 440 includes a controller, such as a computer or a data processor (DP) 444 (or multiple ones of them), a computer-readable memory medium embodied as a memory (MEM) 646 that stores a program of computer instructions (PROG) 448.

At least one of the PROGs 418, 428 is assumed to include program instructions that, when executed by the associated one or more DPs, enable the device to operate in accordance with exemplary embodiments of this invention. That is, various exemplary embodiments of this invention may be implemented at least in part by computer software executable by the DP 414 of the UE 10; and/or by the DP 424 of the radio network access node 21; and/or by hardware, or by a combination of software and hardware (and firmware).

For the purposes of describing various exemplary embodiments in accordance with this invention the UE 10 and the radio network access node 21 may also include dedicated processors 415 and 425 respectively.

The computer readable MEMs 416, 426 and 446 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 414, 424 and 444 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 412 and 422) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:
3GPP Third Generation Partnership Project
BBU baseband unit
BSR beam status report
eMBB enhanced mobile broadband
eNB base station of an LTE system
E-UTRAN evolved UMTS radio access network
FDM frequency division multiplex
gNB base station of a 5G system
HARQ hybrid automatic repeat request
LCH logical channel
LTE long term evolution (of E-UTRAN; also referred to as 4G)
ms millisecond
MTC machine type communication
NR new radio (also referred to as 5G)
OFDM orthogonal frequency division multiplex
PDCCH physical downlink control channel
PUCCH physical uplink control channel
PUSCH physical uplink shared channel
RRH remote radio head
SR scheduling request
SRB signalling radio bearer
TDM time division multiplex
UMTS universal mobile telecommunications service
URLLC ultra-reliable low-latency communication
WLAN wireless local area network

What is claimed is:

1. A method comprising: determining one or more mappings of scheduling requests to corresponding one or more logical channels configured for a user equipment; configuring the user equipment with configuration of the one or more mappings of the scheduling requests corresponding to the one or more logical channels configured for the user equipment and configuring the user equipment with configuration of mapping of one or more of a plurality of different lengths of transmission time intervals for an uplink radio resource for data transmission of the one or more logical channels; receiving a scheduling request from the user equipment that is mapped to the one or more logical channels; allocating, based in part on the configuration of mapping of one or more of a plurality of different lengths of a transmission time interval corresponding to the one or more logical channels to which the received scheduling request was mapped, an uplink radio resource to be used by the user equipment such that the transmission time interval of the allocated uplink radio resource has a length corresponding to a length no longer than the shortest length of the longest one or more lengths of the one or more of the plurality of different lengths of a transmission time interval configured for the mapped one or more logical channels; and receiving data from the user equipment on the allocated uplink radio resource for the one or more logical channels.

2. The method of claim 1, wherein the one or more mappings of the scheduling requests are configured for the user equipment by a radio access network.

3. The method of claim 1, wherein there are multiple logical channels corresponding to different sets of the multiple transmission time intervals, and the allocating is performed to select at least one of the multiple transmission time intervals in the sets and to allocate one of the selected at least one of the multiple transmission time intervals for the transmission time interval of the allocated uplink radio resource.

4. The method of claim 1, wherein a length of a transmission time interval that bears the scheduling request is mapped to the length of the transmission time interval of the one or more logical channels configured for the user equipment.

5. The method as in claim 1, wherein each logical channel maps to at most one scheduling request configured for the user equipment.

6. The method as in claim 1, wherein the allocation of the uplink radio resource explicitly identifies the length of the transmission time interval of the allocated uplink radio resource.

7. The method of claim 1, wherein:
the method is performed by a radio access network serving the user equipment; and
where the uplink radio resource is allocated in reply to receiving the scheduling request and the data is received on the allocated uplink radio resource thereafter.

8. The method of claim 1, wherein the allocating is performed to allocate one of the plurality of lengths of the transmission time intervals as the length of the transmission time interval of the allocated uplink radio resource.

9. The method of claim 1, wherein: the scheduling request maps to at least a first and a second logical channel configured for the user equipment; and the length of a transmission time interval that bears the scheduling request is mapped to the at least first and second logical channels such that the length of the transmission time interval that bears the scheduling request is matched to the shortest one of the longest lengths of transmission time intervals configured for the at least first and second logical channels that are configured for the user equipment.

10. An apparatus comprising: at least one memory storing computer program instructions; and at least one processor; wherein the at least one memory with the computer program instructions is configured with the at least one processor to cause the apparatus to: determine one or more mappings of scheduling requests to corresponding one or more logical channels configured for a user equipment; configure the user equipment with configuration of the one or more mappings of the scheduling requests corresponding to one or more logical channels configured for the user equipment and configure the user equipment with configuration of mapping of one or more of a plurality of different lengths of transmission time intervals for an uplink radio resource for data transmission of the one or more logical channels; receive a scheduling request from the user equipment that is mapped to the configured one or more logical channels; allocate, based in part on the configuration of mapping of one or more of a plurality of different lengths of a transmission time interval corresponding to the one or more logical channels to which the received scheduling request was mapped, an uplink radio resource to be used by the user equipment such that a transmission time interval of the allocated uplink radio resource has a length corresponding to a length no longer than the shortest length of the one or more longest lengths of the one or more of the plurality of different lengths of a transmission time interval configured for the mapped one or more logical channels; and receive data from the user equipment on the allocated uplink radio resource for the one or more logical channels.

11. The apparatus of claim 10, wherein a length of a transmission time interval that bears the scheduling request is mapped to the length of the transmission time interval of the one or more logical channels configured for the user equipment.

12. The apparatus of claim 10, wherein the allocation of the uplink radio resource explicitly identifies the length of the transmission time interval of the allocated uplink radio resource.

13. The apparatus of claim 10, wherein: the scheduling request maps to at least a first and a second logical channel configured for the user equipment; and the length of a transmission time interval that bears the scheduling request is mapped to the at least first and second logical channels such that the length of the transmission time interval that bears the scheduling request is matched to the shortest one of the longest lengths of transmission time intervals configured for the at least first and second logical channels that are configured for the user equipment.

14. An apparatus comprising:
at least one memory storing computer program instructions; and
at least one processor;
wherein the at least one memory with the computer program instructions is configured with the at least one processor to cause the apparatus to:
receive, by a user equipment, configuration of one or more mappings of scheduling requests corresponding to one or more logical channels configured for the user equipment and configuration of mapping of one or more of a plurality of different lengths of transmission time intervals for an uplink radio resource for data transmission of the one or more logical channels;
determine, by the user equipment, a scheduling request is triggered by one or more logical channels configured for the user equipment with data available for transmission;
transmit, by the user equipment, the scheduling request mapped, via the received configuration of the one or more mappings of scheduling requests, to the one or more logical channels configured for the user equipment;
receive, by the user equipment, an allocation of an uplink radio resource,
wherein a transmission time interval of the allocated uplink radio resource has a length corresponding to a length of a transmission time interval configured for at least one of the mapped one or more logical channels; and
send data, by the user equipment, on the allocated uplink radio resource from at least one of one or more logical channels having configured one or more longest lengths, of one or more of the plurality of different lengths of transmission time intervals, that are no shorter than the transmission time interval length of the allocated uplink radio resource.

15. The apparatus of claim 14, wherein the allocation of the uplink radio resource explicitly identifies the length of the transmission time interval of the allocated uplink radio resource.

16. The apparatus of claim 14, wherein the at least one memory with the computer program instructions is configured with the at least one processor to cause the apparatus further to: receive the allocation in reply to the scheduling request.

* * * * *